United States Patent
Azema

[19]

[11] Patent Number: 6,116,830
[45] Date of Patent: Sep. 12, 2000

[54] TELESCOPIC PROTECTIVE SHIELD FOR FOLLOWING THE MOVEMENTS OF A MOVING PART

[75] Inventor: Andre Azema, Saix, France

[73] Assignee: Renault Automation, Boulogne-Billancourt, France

[21] Appl. No.: 09/091,240

[22] PCT Filed: Dec. 13, 1996

[86] PCT No.: PCT/FR96/01996

§ 371 Date: Jun. 18, 1998

§ 102(e) Date: Jun. 18, 1998

[87] PCT Pub. No.: WO97/22832

PCT Pub. Date: Jun. 26, 1997

[30]   Foreign Application Priority Data

Dec. 19, 1995 [FR] France ............................ 95 15116

[51] Int. Cl.[7] ............................................... B23C 1/30
[52] U.S. Cl. ..................... 409/134; 160/220; 160/222
[58] Field of Search ........................ 409/134; 160/211, 160/216, 202, 220, 222; 408/241 G, 234, 88

[56]               References Cited

U.S. PATENT DOCUMENTS

| | | | |
|---|---|---|---|
| 3,565,153 | 2/1971 | Loos | 160/202 |
| 3,603,373 | 9/1971 | Loos | 160/202 |
| 3,658,113 | 4/1972 | Loos | 160/202 |
| 3,751,120 | 8/1973 | Kietz | 308/3 A |
| 4,039,021 | 8/1977 | Moritz et al. | 160/202 |
| 4,522,246 | 6/1985 | Bierbrauer et al. | 160/223 |
| 4,842,455 | 6/1989 | Winkler et al. | 409/134 |
| 4,946,322 | 8/1990 | Colligan | 409/137 |
| 5,169,223 | 12/1992 | Suzuki et al. | 312/330.1 |
| 5,181,898 | 1/1993 | Piotrowski | 483/3 |
| 5,482,414 | 1/1996 | Hayashi et al. | 409/134 |
| 5,560,415 | 10/1996 | Geissler | 160/220 |
| 5,570,979 | 11/1996 | Okamoto et al. | 409/134 |

*Primary Examiner*—David P. Bryant
*Assistant Examiner*—Essama Omgba
*Attorney, Agent, or Firm*—Oblon, Spivak, McClelland, Maier & Neustadt, P.C.

[57]                ABSTRACT

A telescoping protective cowling for removing part of a machine tool. The device includes at least three elements consisting of panels and one of which is stationary or relative to the frame and provided with a window with inside edges restricting the freedom of movement of a moving part. The second panel is slidable relative to the first panel along two axes, is longer than the window of the first panel and is provided with a window within which the moving part is free to move. The third panel is movable and substantially larger than the window in the first panel and receives the moving part in its central portion. As a result, the movements of the moving part in the plane of the two axes in the window in the first panel means that the second panel has a proportional mobility and is thus able to fill the opening of the window in the first panel after it has been left clear by the third panel following the movements of the moving part.

5 Claims, 3 Drawing Sheets

TELESCOPIC PROTECTIVE SHIELD FOR FOLLOWING THE MOVEMENTS OF A MOVING PART

BACKGROUND OF THE INVENTION

1. Field of the Invention

The present invention relates to the field of machine tools and more particularly to modifications with which a movable machining device can be displaced at high speed under the best environmental conditions.

2. Discussion of the Background

High-speed machining of parts in a machine tool generally takes place using a rotationally driven bit at the end of an electric spindle installed in a slide, which itself is mounted to be movable along two axes X, Y of a plane parallel to the plane of machining of the parts.

To facilitate reading of the description to follow, the plane XY of mobility of the movable device constituting the slide of the electric spindle will be assumed to be vertical, as is the case in the majority of embodiments of this type of machine tool in the field of high-speed machining.

A machine tool is classically provided with three main working stations, to wit:

- a machining station proper, provided with the bit driven rotationally at the end of the electric spindle and shaping the part to be machined,
- a drive station situated upstream from the machining station and made up of an assembly of devices that ensure in particular the X, Y and Z displacements of the slide of the electric spindle and the rotation of said spindle,
- and a control station cooperating with the drive station and functioning with a program of instructions preestablished to take charge of the different stages of machining of the said part.

The Applicant has observed that, in machine tools for high-speed machining, the separation of the machining station from the drive station is never physically well defined, especially as regards the virtual vertical plane marking the boundary between the two stations. In fact, to permit free motion of the movable slide along the two axes X and Y in a displacement plane parallel to this vertical boundary plane, the most classical embodiment comprises making the external machining zone communicate with the internal drive zone of the machine. This results in major problems of protection with respect to how closely personnel can approach the inside of the drive station and also to the devices of the drive station, which are sensitive to thrown-off machining chips and to pollution in the external environment of the machine, which is generally placed in the midst of a more or less contaminated atmosphere.

This separation becomes necessary when the motors driving the devices of the machine in translational movement are linear motors. In fact, these motors are equipped with a permanent-magnet block, which thus attracts all wastes of metallic nature. In addition, the leaktightness of such a structure, which is most often planar, is never perfect regardless of the means for assuring leaktightness.

The publication DE A 4405247 describes a physical element having the form of a protective cowling for a device movable along two axes in a plane, comprising elements disposed parallel to the plane of displacement of the said movable device and guided by at least two pantographs, the end points of which are joined in articulated manner to the fixed first element and to a movable element, and the intermediate points of which are joined to movable intermediate elements, such that a displacement of the movable last element brings about a proportional displacement of the intermediate elements. In the present case of machine tools for high-speed machining, this protective cowling is therefore supposed to permit the installation of a distinct boundary between the machining station and the drive station and, in addition to sealing functions, it must also ensure great freedom of motion of the movable device (slide carrying the electric spindle) in a plane parallel to the machining plane. This preliminary disposition of the protective cowling has as an advantage the ability to act dynamically as a "hermetic" seal for the housing enclosing the devices of the drive station while ensuring that the movable device extending from the said housing has the kinematic ability necessary for positioning the bit during the different machining phases. In addition, the guarantee of leaktightness of the housing to external pollution for protection of the sensitive devices assembled in the drive station can be further improved by pressurizing the internal volume thereof relative to the outside situated behind the protective cowling.

SUMMARY OF THE INVENTION

To achieve these objectives, the telescoping cowling of the invention for protection of a device movable along the two axes X and Y meets all of these conditions and is adaptable more particularly to machine tools using high-speed machining operations with bits carried at the end of its electric spindle. For this purpose, the protective cowling of the invention is remarkable in that the said elements comprise panels, of which:

- the first, fixed relative to the frame, is provided with a window through which the said movable device passes and the inner edges of which define the limits of freedom of motion of the latter,
- the second, mounted slidingly relative to the first panel along the two displacement axes X, Y, has dimensions overlapping those of the window of the first panel and is provided with a window permitting motion of the said movable device,
- and the third, movable and with dimensions substantially larger than those of the window of the first panel, accommodates at its center the said movable device, in such a way that the displacements of the movable device in the window of the first panel in the plane of the two axes X and Y brings about proportional mobility of the intermediate second panel, which is suitable for filling the opening of the window of the first panel left uncovered by the third panel as it accompanies the displacements of the said movable device.

The basic merit of this characteristic is to propose a cowling of three independent parts that cooperate with each other in such a way that:

- the exterior panel can cover the part of the front face of the housing which is open around its window defining the limits of advance of the said movable device,
- the intermediate panel can fill in as cover for the opening of the window of the exterior panel left free around the interior panel when the said movable device is displaced inside the said window, especially when it is close to the edges thereof,
- and the interior panel can ensure that the opening of the window of the intermediate panel is covered around the said movable device.

In addition, when the movable device is displaced along the two axes X and Y in the window of the exterior panel, the interior panel cooperating therewith causes an identical displacement of the articulated end points of the pantographs to which it is joined and deforms the structure of the same pantographs, which transmit a displacement to the intermediate points thereof and to the intermediate panel joined thereto, since the position of the other two end points joined to the exterior panel is fixed.

The operation of a pair of pantographs as instruments for guiding the displacements of the intermediate panel offers numerous non-negligible advantages.

On the one hand, depending on the disposition of the intermediate points relative to the end points, they impose, for a unit of displacement of the movable device and of the interior panel attached thereto along the axes X or Y, a proportional unit of X or Y displacement of the intermediate panel such that the window of the exterior panel is always covered when the movable device borders the sides thereof, and this for a minimum overlap of the intermediate panel around the window of the fixed panel regardless of the travel of the movable device.

On the other hand, in the case of a vertical cowling, when the upper end points are joined to the high portion of the exterior panel, they ensure suspension and support of the intermediate panel between the interior panel and the exterior panel.

According to a particularly advantageous characteristic of the invention, two flat springs are disposed one on each side of the axis of the movable device, their central part being integral with the x and y movements of the movable device and their two ends being fixed to the said third panel such that they ensure that the extreme edges of that panel will press flat against the internal surface of the said intermediate panel. Thus a constant pressure is exerted on the joints, making it possible to ensure optimum leaktightness of the cowling and to compensate for the flatness defects as well as the spaces created between the panels when they are located slightly overhangingly in the extreme travel positions.

BRIEF DESCRIPTION OF THE DRAWINGS

Although the main aspects of the invention considered to be novel have been expressed hereinabove, more ample details concerning a preferred embodiment of a protective cowling in conformity with the fundamental concepts of the invention will be better understood by referring to the description hereinafter and to the accompanying drawings illustrating the said embodiment.

On these drawings.

DETAILED DESCRIPTION OF THE PREFERRED EMBODIMENTS

Figure 1:
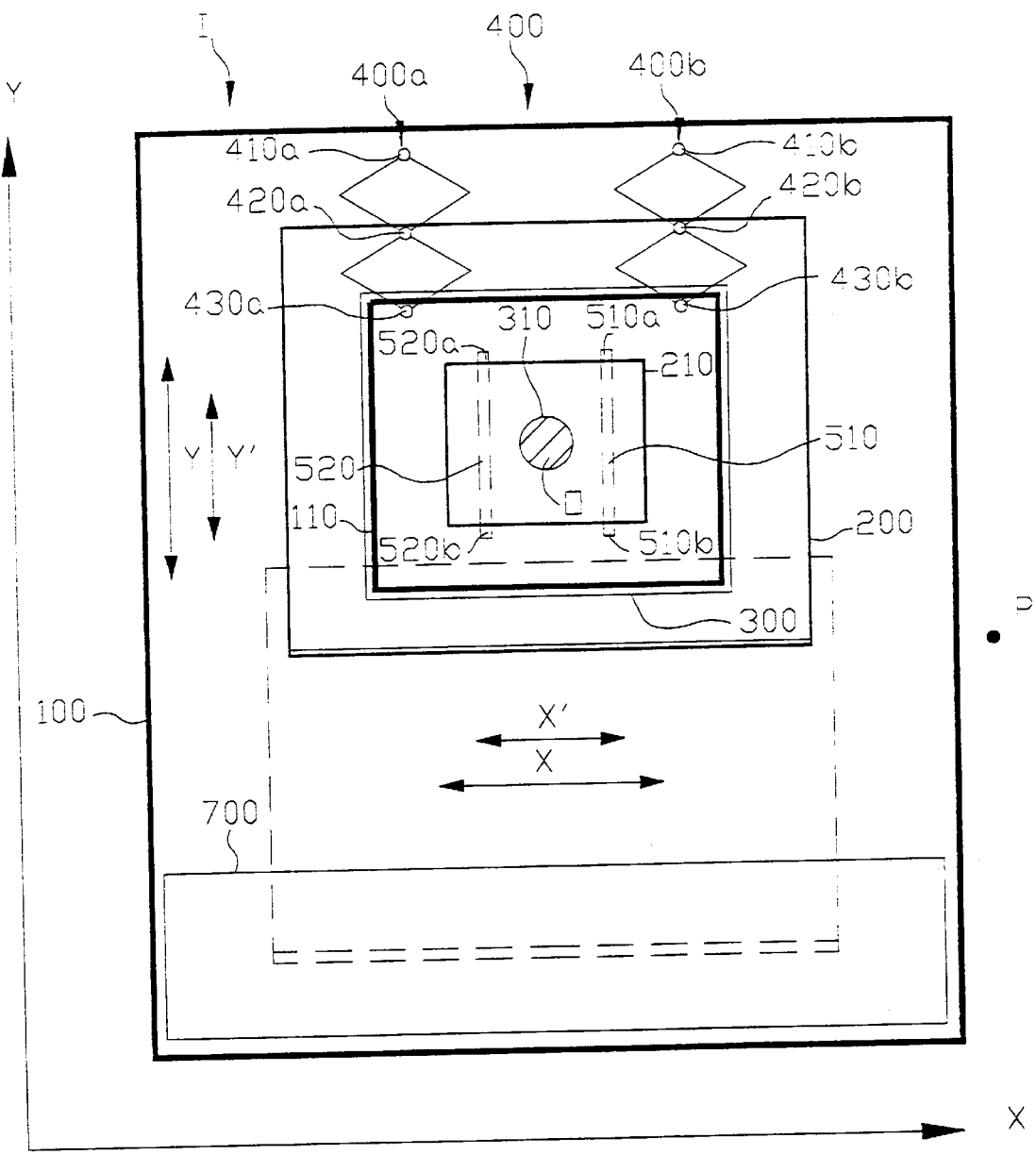
FIG. 1 is a front view of such a telescoping protective cowling with a central position of the movable device.

As illustrated on the drawings as a whole, the telescoping cowling of the invention denoted by I as a whole is designed to ensure protection of a movable device, such as the slide (symbolized by the central shaded part O) of an electric spindle of a machine tool not shown, which moves in a vertical plane P according to displacements along the two axes X and Y, illustrated by the two double-headed arrows x and y. This slide O is also capable of motion relative to the cowling I, in a third translational movement illustrated by the arrows z of FIGS. 1a and 2a. This translational movement z specific to the slide as well as the rotational movement of the electric spindle will not be developed in the present description, because they do not add anything further to good understanding of the object of the present invention. This telescoping protective cowling is therefore designed to be installed perpendicular to the axis of the movable device O in a vertical plane parallel to the plane P of the two axes X and Y of mobility thereof, in order to define the limits of a physical boundary between the outside of the machine where a part is being machined by the bit attached at the end of the electric spindle, and the inside of the same machine, where there are installed the devices, which are sensitive to the surrounding pollution, for driving the said movable device.

According to the invention, the cowling I comprises three superposed vertical panels 100, 200 and 300 disposed parallel to the vertical plane P of displacement of the movable device O.

The first panel 100, situated on the outside of the machine, is mounted fixedly relative to the housing of the frame and is provided with a rectangular window 110, through which the movable device O extends and the inner edges of which define the limits of freedom of motion (arrows x and y) thereof.

The second panel 200, which is rectangular and situated toward the inside of the machine, and which is referred to as the intermediate panel, is mounted slidingly relative to the first panel 100 along the two axes X and Y according to two movements illustrated by the two double-headed arrows x' and y'. With dimensions smaller than those of the first panel 100, it outwardly overlaps the window 110 thereof for the purposes of covering it regardless of the position of the movable device O. It is also provided at its center with a rectangular window 210 disposed around the movable device and inwardly overhanging the edges of the window 110 of the panel 100 for a distance equal to that of the overlap of the intermediate panel 200 around the same window.

The third panel 300, which is rectangular and situated behind the intermediate panel 200 toward the inside of the machine, accommodates at its center a sleeve 310 in which there is installed the slide O of the electric spindle, which is also mounted to be movable perpendicular to the panel 300 in the inside of the sleeve 310, as shown by the arrow z. This panel 300, of dimensions substantially larger than those of the window 110 of the fixed panel 100, is urged in the same displacements of arrows x and y as those of its central sleeve 310 carried by the slide O of the electric spindle, which in the context of the present invention is understood to be the movable device.

A guide means 400 comprising two pantographs 400a and 400b situated in the same upper half-plane and on the same side of the fixed panel 100 makes it possible to ensure that the intermediate panel 200 is kept suspended and that it is guided in its displacements (arrows x' and y') between the panel 100 and the panel 300. For this purpose, the upper end points 410a and 410b of the pantographs 400a and 400b are joined in articulated manner to the fixed panel 100, the intermediate points 420a and 420b to the intermediate panel 200 and the lower end points 430a and 430b to the movable panel 300, such that a displacement (arrows x and y) of the panel 300 deforms the structures of the pantographs 400a and 400b, which necessarily transmit a proportional displacement (arrows x' and y') to their intermediate points 420a and 420b, since the position of the upper end points 410a and 410b is fixed relative to the fixed panel 100. By virtue of their displacements, these intermediate points 420a and 420b impart mobility to the intermediate panel 200 to which they are joined. According to a preferred embodiment of the invention, the intermediate points 420a and 420b are situated at the center of the end points of the pantographs 400a and 400b, so that a unit of displacement (arrows x and y) of the movable interior panel 300 suggests a half-unit of displacement (arrows x' and y') of the intermediate panel 200. This then results in simplifications of the panels, since it is sufficient that the overlap distances of the panel 200 to be respected inwardly and/or outwardly around the window 110 of the fixed panel 100 are equal to at least half the distances of displacement (arrows x and y) of the movable device O authorized inside the said window 110. This arrangement has the advantage of making the second panel 200 capable of completely filling the opening of the window 110 left uncovered by the panel 300 as it accompanies the x and y displacements of the slide of the electric spindle.

Figure 1A:
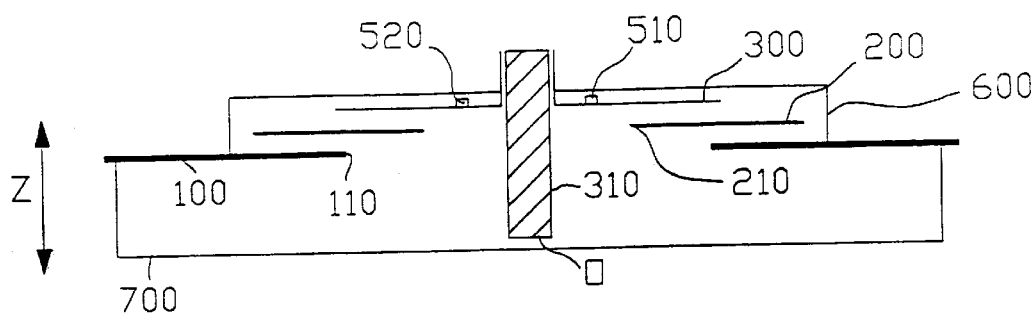
FIG. 1a is a top view of the drawing of FIG. 1.

The drawings of FIGS. 1 and 1a illustrate the telescoping protective cowling I with the three panels 100, 200 and 300 in "intermediate" position, or in other words when the sleeve 310 of the panel 300 is at the center of the window 110. It is then observed that the opening of the latter is entirely covered by the panel 300 by itself and partly by the panel 200.

Figure 2:
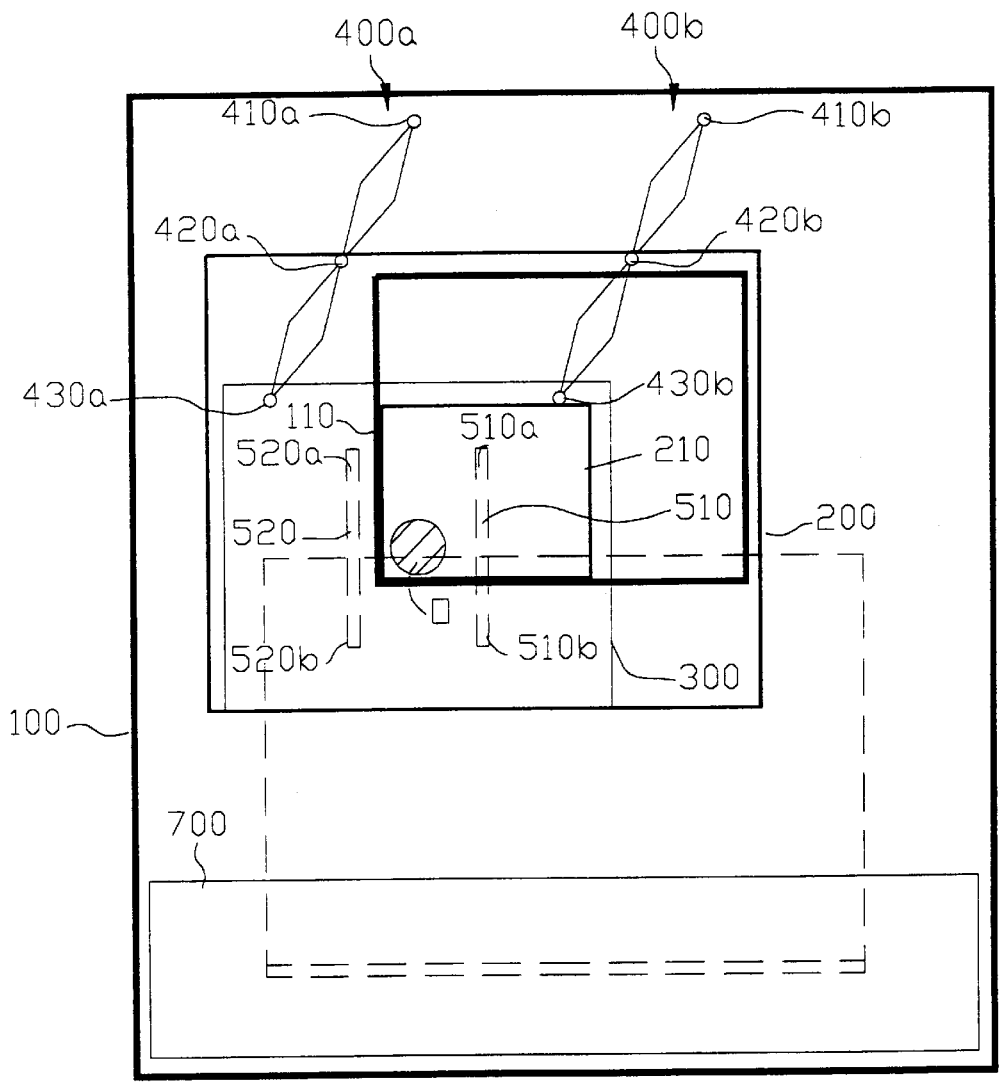
FIG. 2 is a front view of this protective cowling with an extreme position of the movable device.
Figure 2A:
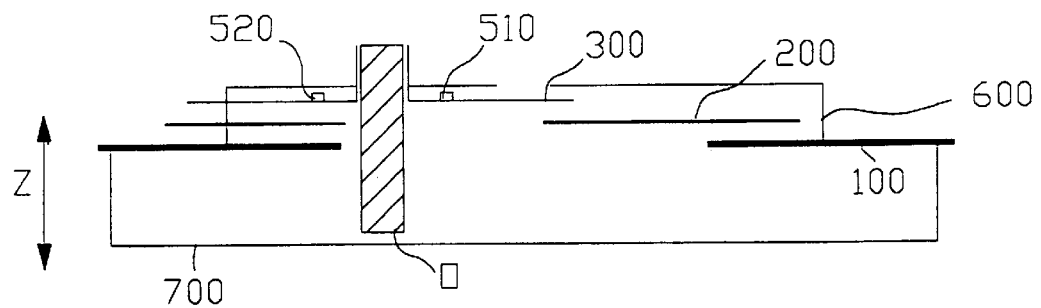
FIG. 2a is a top view of the drawing of FIG. 2.

In the drawings of FIGS. 2 and 2a, the sleeve 310 of the panel 300 which has been displaced (arrows x and y) into the left lower corner of the window 110 of the panel 100 no longer ensures coverage of the opening of the same window at the position of its upper part and of its right part. This coverage is provided by the panel 200, which has followed a displacement proportionally reduced by half (arrows x' and y') and thus continues to cover the opening of the window 110, since these outside contours are kept back from the window 110 and since its inner window 310 is entirely covered by the panel 300.

According to a preferred embodiment of the invention, two flat springs 510 and 520 are disposed one on each side of the axis of the movable device O, their central part being integral with the x and y movements of the movable device O and their two ends 510a, 510b and 520a, 520b being fixed to the said third panel 300 such that they ensure that the extreme edges of that panel 300 will press flat against the internal surface of the said intermediate panel 200. The function of these springs 510 and 520 is to hold the joints on the surfaces with which they must achieve leaktightness, regardless of the position of the movable device O, while compensating for the flatness defects that can occur in the extreme positions of the movable device O.

Figure 3:
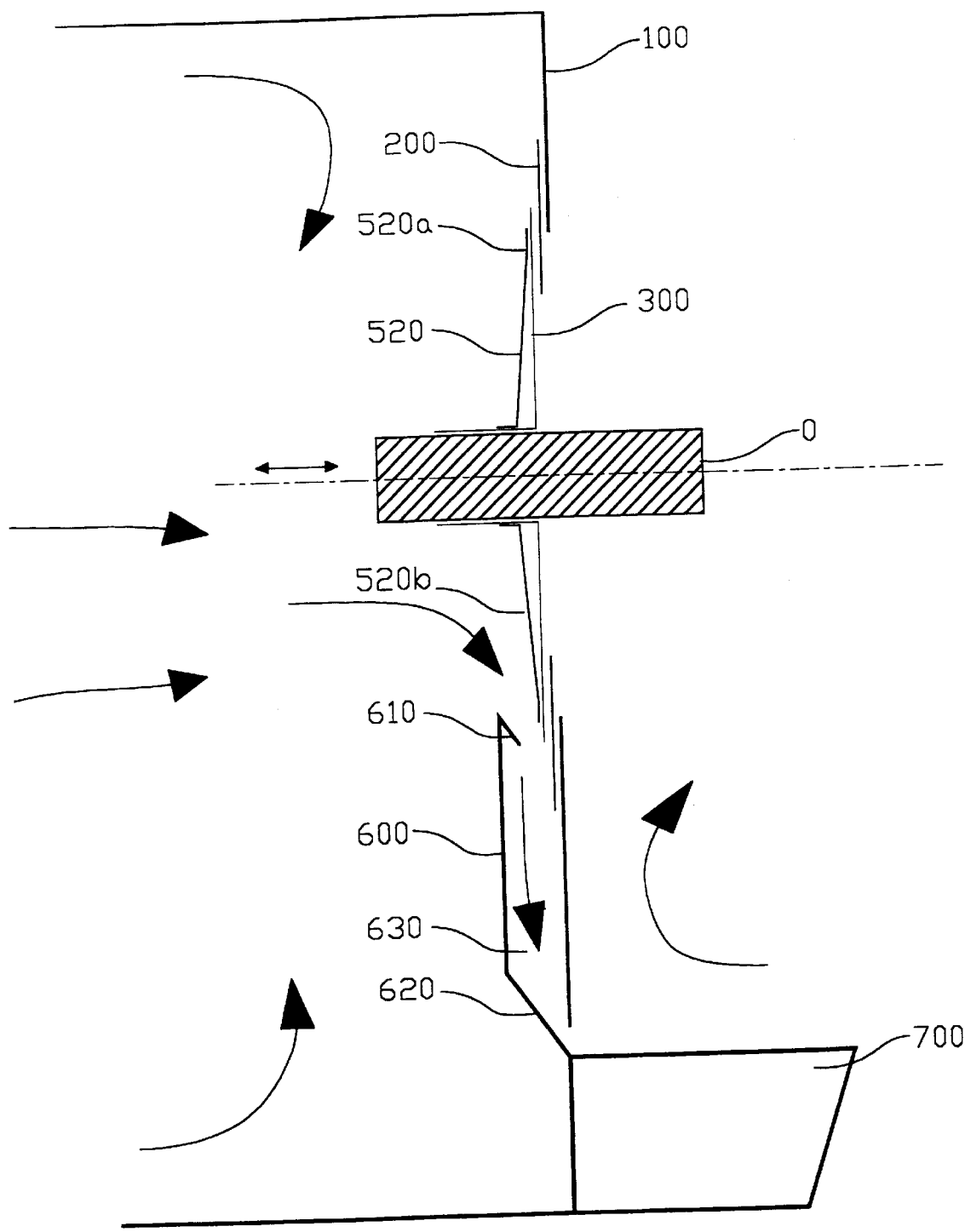
FIG. 3 is a side view of such a telescoping cowling with a central position of the movable device.

As illustrated in the drawing of FIG. 3, a chute 600 fixed to the frame close to the said cowling I ensures collection, over the entire width of the window 110 provided in the first panel 100, of dust or chips that have infiltrated through the said cowling I. In fact, since the joints are most often placed on the fixed part and since the window 110 provided in the first panel 100 is larger than the window 210 provided in the intermediate panel 200, and taking into account the fact that the cowling I is vertical, it is particularly judicious to place this chute 600 under the entire width of the window 110 to recover the maximum of dust and chips.

Advantageously, the said chute 600 is made of a flat profile preformed at its upper end 610 in such a way as to form a first constriction with the wall of the cowling I, which constriction facilitates falling of chips or dust into the inside of the chute and prevents the dust or chips from climbing back up the said chute and, at the level of its lower end 620, a second constriction facilitating evacuation of the dust or chips to the outside of the housing toward the collection trough 700, which is classically situated between the vertical wall of the machine tool and the machining station.

The chute 600 forms with the wall of the said cowling I a pressure-drop airlock 630 discharging to the collection trough 700 situated in the machining station, while preventing infiltration of clouds of metallic dust and ensuring evacuation of the wastes infiltrating through the joints of the said cowling under the action of an air movement created in the inside of the housing formed by the machine tool. In fact, when equipped with this cowling, the machine tool forms a quasi-hermetic housing which permits the air pressure in the interior thereof to be increased either by the devices already present in the housing (supply by pneumatic devices, fan integrated into the components) or by an auxiliary ventilation source provided for this purpose. The displacement of air under pressure created in the housing of the machine tool will ensure, by virtue of the constrictions 610 and 620, a suction phenomenon making it possible to evacuate all of the dust and chips that have been able to infiltrate into the inside of the housing of the machine tool. Another advantage of this chute 600 is that the pressure drop beginning at the level of the airlock 630 permits a continuous jet of air toward the outside, which prevents the clouds of metallic dusts created by machining, especially by machining of cast iron, from infiltrating via the first constriction situated at the end 620 of the chute 600. As such auxiliary collection means, this chute, in association with the cowling I, permits a better guarantee of the service life of the components of the machine tool.

It is understood that the description and illustration just given hereinabove of the telescoping protective cowling are given for the purpose of disclosure and not limitation. It is obvious that various arrangements of, as well as modifications and improvements to, the example hereinabove will be possible without departing from the scope of the invention taken in its broadest aspects and spirit.

For example, it is possible to interpose a plurality of intermediate panels 200 between the exterior panel 100 and the interior panel 300 guided in their displacements by pantographs at a plurality of intermediate points (the number being equal to that of the intermediate panels), each joined to an intermediate panel.

What is claimed is:

1. A protective cowling for a machine-tool output device movable along two axes X and Y in a vertical plane, comprising at least three superposed elements disposed parallel to the plane of displacement of the movable device and guided by at least two pantographs having end points joined in articulated manner to a first element and to a third element of the at least three superposed elements, the pantographs further having intermediate points joined to a movable intermediate element, such that a displacement of the third element brings about a proportional displacement of the intermediate element, in which said at least three superposed elements comprise respective non-enclosing panels, wherein:

the first element is fixed relative to the frame and is provided with a first window for motion of the movable device, the intermediate element slides relative to the first element along the two displacement axes X, Y, has dimensions overlapping those of the window of the first element and is provided with a second window for motion of the movable device, the third element is movable and has dimensions substantially larger than those of the first window and carries said movable device, said cowling ensures tight sealing of the open front face of a housing accommodating drive devices of the movable device, said fixed first panel is disposed outside the housing and said movable third panel is disposed inside said housing, and, finally, the pantographs are situated in the vertical upper half-plane of the first panel, in such a way that said intermediate panel can be kept suspended at the intermediate points of said pantographs.

2. The protective cowling according to claim 1, further comprising two flat springs which are disposed one on each side of the longitudinal axis of the movable device, their central part being integral with x and y movements of the movable device above the two displacement axes X, Y and their two ends being fixed to said third panel such that they ensure that the extreme edges of that panel will press flat against the internal surface of said intermediate panel.

3. The protective cowling according to claim 1, further comprising a chute fixed to the frame close to the cowling to ensure collection, over the entire width of the window provided in the first panel, of dust or chips that have infiltrated through the cowling.

4. The protective cowling according to claim 3, wherein said chute is made of a flat profile preformed at its upper end in such a way as to form a first constriction with the wall of the cowling, which constriction facilitates falling of the chips or dust into the inside of the chute and prevents the dust or chips from climbing back up said chute and, at the level of its lower end, a second constriction facilitating evacuation of the dust or chips to the outside of the housing.

5. The protective cowling according to claim 4, wherein said chute forms with the wall of the cowling a pressure-drop airlock discharging to a collection trough situated in the machining station, while preventing infiltration of clouds of metallic dust and ensuring evacuation of wastes infiltrating through joints of the cowling under the action of an air movement created in the inside of the housing formed by the machine.

* * * * *